(12) United States Patent
Rosenberg

(10) Patent No.: US 8,712,319 B2
(45) Date of Patent: Apr. 29, 2014

(54) SYSTEM AND APPARATUS FOR CONTROL OF PUBLISHED CONTENT

(75) Inventor: Einar Rosenberg, Miami, FL (US)

(73) Assignee: Tahnk Wireless Co., LLC, Dover, DE (US)

( * ) Notice: Subject to any disclaimer, the term of this patent is extended or adjusted under 35 U.S.C. 154(b) by 292 days.

(21) Appl. No.: 13/149,650

(22) Filed: May 31, 2011

(65) Prior Publication Data

US 2012/0115415 A1 May 10, 2012

Related U.S. Application Data

(60) Provisional application No. 61/396,678, filed on May 31, 2010.

(51) Int. Cl.
*H04H 60/09* (2008.01)

(52) U.S. Cl.
USPC ....... 455/3.04; 455/3.01; 455/3.03; 455/3.05; 455/3.06; 455/418; 455/420; 455/41.1; 455/41.2; 455/41.3; 455/566; 348/14.01; 348/14.02; 348/14.03; 348/14.04

(58) Field of Classification Search
USPC ............. 705/1.1, 14.4, 14.37; 455/3.01, 3.03, 455/3.04, 3.05, 3.06, 418, 420, 41.1, 41.2, 455/41.3, 566; 348/14.01, 14.02, 14.03, 348/14.04
See application file for complete search history.

(56) References Cited

U.S. PATENT DOCUMENTS

| | | | |
|---|---|---|---|
| 7,450,954 B2 | 11/2008 | Randall | |
| 7,548,915 B2 | 6/2009 | Ramer et al. | |
| 7,756,467 B2 * | 7/2010 | Bent et al. | 455/3.04 |
| 2006/0064373 A1 | 3/2006 | Kelley | |
| 2006/0179127 A1 | 8/2006 | Randall | |
| 2007/0124721 A1 | 5/2007 | Cowing et al. | |
| 2007/0294096 A1 * | 12/2007 | Randall et al. | 705/1 |
| 2008/0156865 A1 | 7/2008 | Leifer | |
| 2008/0191878 A1 | 8/2008 | Abraham | |
| 2009/0156190 A1 | 6/2009 | Fisher | |
| 2009/0192898 A1 | 7/2009 | Baril | |
| 2009/0203367 A1 | 8/2009 | Pamminger et al. | |
| 2009/0240598 A1 | 9/2009 | Kargman | |
| 2010/0093412 A1 | 4/2010 | Serra et al. | |
| 2011/0173060 A1 | 7/2011 | Gallagher | |

* cited by examiner

*Primary Examiner* — Tuan A Tran

(57) ABSTRACT

A system is provided that allows a user using her/his own mobile communication device to control content on a content publishing device. The mobile communication device uses information received from a data tag on the content publishing device to communicate with a content server providing the content to be published on a content publishing device and run a program on the content server allowing the mobile communication device to at least temporarily control the data published on the content publishing device.

23 Claims, 6 Drawing Sheets

SYSTEM AND APPARATUS FOR CONTROL OF PUBLISHED CONTENT

CROSS REFERENCE TO RELATED APPLICATION

This application claims the benefit of U.S. Provisional Patent Application No. 61/396,678, filed May 31, 2010, the disclosure of which is incorporated herein by reference in its entirety.

BACKGROUND OF THE INVENTION

The present invention relates to wireless electronic data control and transfer and more specifically to uses and applications of near field communications.

With the decreased cost of flat panel/flat screen televisions/monitors having quality images, there has been corresponding increase in the use of these monitors for marketing and sales. As opposed to fixed images of conventional light boxes and print advertisements, the content displayed on the monitors is relatively easily changed. Additionally, the displayed content can include music and video. For at least these reasons, monitors are quickly replacing the use of conventional light boxes and print advertisements.

These monitors are connected to display systems that are programmed to publish—display or broadcast, content—i.e., images, video, audio or other media; the display system can be, for example, a dedicated computer which may be either a standalone system or networked to a local or wide area network and the Internet. Typically, the programming takes place in advance of the display of the images. The displayed content can be either a single image or multiple images. If the displayed content is multiple images, then typically the system is programmed to display the multiples images in a predefined way; for example displaying each image for a period of time, using a defined transition between images, and then transiting between images for a period of time.

In another approach, a user of the monitor can use a controller to control the display of content. If the controller is a remote control unit then a user can use the remote control to control the display be problematic—it may in need of power (e.g., batteries worn down) or more importantly, the remote control may be missing or not located near the monitor. If the controller is a touch screen display, then this would be counter intuitive, as the use of touch screen displays significantly drives up the cost of the monitor.

Therefore, it would be desirable to have a controller that is relatively easy accessible to a user, but not costly.

DETAILED DESCRIPTION OF THE INVENTION

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical, or other changes may be made to the specific embodiments disclosed without departing from the spirit and scope of the present invention.

The exemplary invention seeks to address the problem addressed above and provide a solution at least in an exemplary embodiment through the use of a mobile communication device being capable of near field communications.

Figure 1:
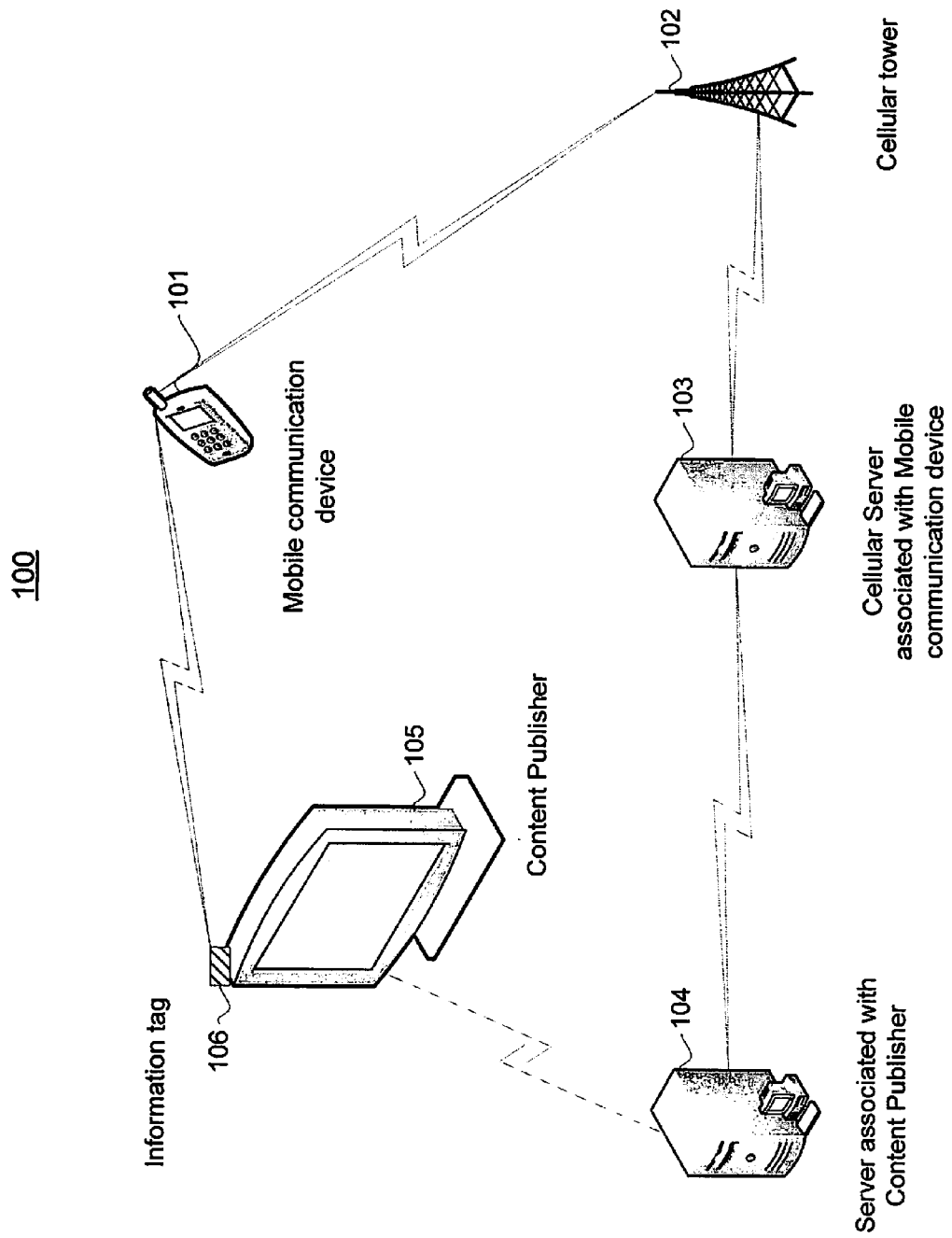
FIG. 1 is a remote control system in accordance with an exemplary embodiment of the invention.

FIG. 1 depicts the near field remote controlling system 100 according to an exemplary embodiment. The system 100 includes a near field communication capable mobile communication device 101, cellular tower 102, cellular server 103 associated with mobile communication device, server 104 associated with content publisher, and content publisher, a monitor, 105.

Mobile communication device 101 is a cell phone, smart phone or another portable communication device that is capable of near field communications and capable of cellular communications, including, at least, data communications. In a preferred approach, the mobile communication device 101 has Internet browsing capabilities and further is able to install and execute programs or "apps." Cellular tower 102 provides cellular communication ability, i.e., including, but not limited to telephonic and data service, between the mobile communication device 101 and its corresponding cellular server 103. The cellular server 103 provides data storage and system processing services for at least clients of the provider of the cellular service.

Institutional server 104 provides data storage and system processing services for an institution. The content publisher 105 is typically a TV/computer monitor located in a sales/advertising area of a store or business and displays content, preferable to a user. The content is typically an audio-visual medium, e.g., movies, videos, etc. The monitor 105 is connected to and in communication with institutional server 104. In a mode, the institutional server 104 serves as a content source and provides the content for publishing, i.e., display, on monitor 105. In a mode, the institutional server 104 is the content controller—it controls the content provided to monitor 105 for display.

Associated with, and preferably located next to, monitor 105 is an information tag 106, which, in a preferred approach, provides information identifying the monitor 105; this information may include, for example, location data reflecting where the monitor 105 is located, e.g., which store, and identifying data identifying the monitor 105. In an approach, the monitor data identifies, by representation, a product or item or service located next to or near the location of the monitor 105. The information tag 106 also provides information identifying an institutional server 104. In an exemplary approach, information tag is a NFC tag that is capable of providing data through NFC communications, where the tag also includes the capability of NFC communications.

The mobile communication device 101 runs, automatically, constantly, or upon request, an appropriate publisher control software/hardware program, e.g., an "app," that can control the near field communication system of the mobile communication device to cause the mobile communication device to read and import data from the tag 106. The publisher control program can be a downloaded from a website or other location and installed for execution on the mobile communication device 101.

The publisher control program uses the data read from the tag 106 to cause the mobile communication device 101 to communicate with its cellular communication server 103; which, in turn, using information from the tag 106 to identify which institutional server to be connected to, causes communication between the mobile communication device 101 and the institutional server 104. The mobile communication device 101 provides data acquired from tag 106 to the institutional server 104, which indicates to the institutional server 104 what it is seeking, e.g., a program that controls content display.

The content display program on the institutional server 104, using information provided from mobile communication device 101 received from tag 106, determines which monitor 105 that the mobile communication device 101 is seeking to control and provides access for the mobile communication device 101 to a control program for controlling the content to be published on monitor 105. Based on input received by the institutional server 104 from the mobile communication device 101, the institutional server 104 provides the user through the publisher control program on the user's mobile communication device 101 with a choice or choices of content sought to be published on the monitor 105. In an approach, the choice of content is dependent on the location of the monitor, e.g., where the location includes both the location of a store where the monitor is located and the location of monitor within the store.

Thus, for example, the monitor data indicates that the monitor 105 is located in a Brookstone® retail store in South Beach, Fla. and that the monitor 105 is in the personal relaxation section of the store and is located next to and associated with a store item, e.g., chair massage device. Thus, having received the location of the monitor 105 and identification of the associated item, the content display program in the server 104 determines appropriate choices of content to be published. In a preferred approach, the content display program is dynamic and can easily change or modify the content choice. In an approach, the content choice is specific to the associated item. In an approach, the content is marketing material about the associated item that is stored on and/or accessible by the content display program but located somewhere else, e.g., a manufacturer's website. However, content choices also include, for example, all or some combination of: various uses for the item, various configurations/options for the item, associated accessories, similar items, pricing (store prices and/or competitor's price), frequently asked questions, warranty/guarantee, availability, instructions on assembly, and instructions on use. Content choices may also include information about various items for sale located near the associated item, information about this department of the store, information about this store location, and information about the store, e.g., the company that owns the store. After the content is selected, the server 104 directs or provides the respective content to the monitor 105, and the monitor 105 published the content.

In an approach, the user using her/his publisher control program also controls logistics of the publishing of the content on the monitor. For example, the user controls: the volume as well, as forwarding, reversing, pausing, stopping and replaying the publishing of the content on the monitor.

In a preferred approach, a program on the institutional server 104 alone, or cooperation with content display program, controls access by users to the content display program. For example, the content display program performs traffic control for multiple users substantially simultaneously seeking access to the content display program for a same item. As part of the traffic control, the content display program prioritizes and enables access by a specific user at a time for a specific item. The content display program may also limit the length of time a user has access to the content display program. For example, the content display program disconnects, in cordial approach, the user from the content display program after three minutes of use if another user has indicated that she wants access to the content display program; the indication based on another user seeking access to the content display program for the associated item. Further, the content display program disconnects the user from the content display program after one minute of lack of response to a prompt by the content display program for a response by the user. In either case, the user is not blocked from subsequently attempting to access the content display program, but may be subject to a traffic control protocol by the content display program.

The content display program may be a single program running on a single server or on several servers or in any reasonably combination. Further, multiple users can access the content display program substantially simultaneously for access to content display for multiple items. Thus, more than one user can control content publishing at a time.

Thus, using her/his own mobile communication device 101, a user can approach a content display device in a store and have a choice of publishing content on the content display device.

In an example, a mobile communication device is a smartphone, i.e., an iPhone®, contains an app that was downloaded from the iTunes® store and subsequently executed and is used to read information from a tag associated with a monitor, the app uses that information to cause the iPhone® to communicate with the appropriate institutional server, and subsequently uses the app on the iPhone® to control the content displayed on the monitor.

In another approach, a user uses an Internet browsing ability of the mobile communication device 101 and goes to an Internet location that has an appropriate publisher control program and runs the publisher control program through the Internet on the mobile communication device 101. For example, a user, who is physically visiting a store, using the Internet browsing ability of her/his the mobile communication device 101 visits a website of the store, and executes a publisher control program on the store's website. Identification data received from tag 106 indicates to the publisher control program the monitor 105 on which the user seeks to control the display of content.

Figure 2:
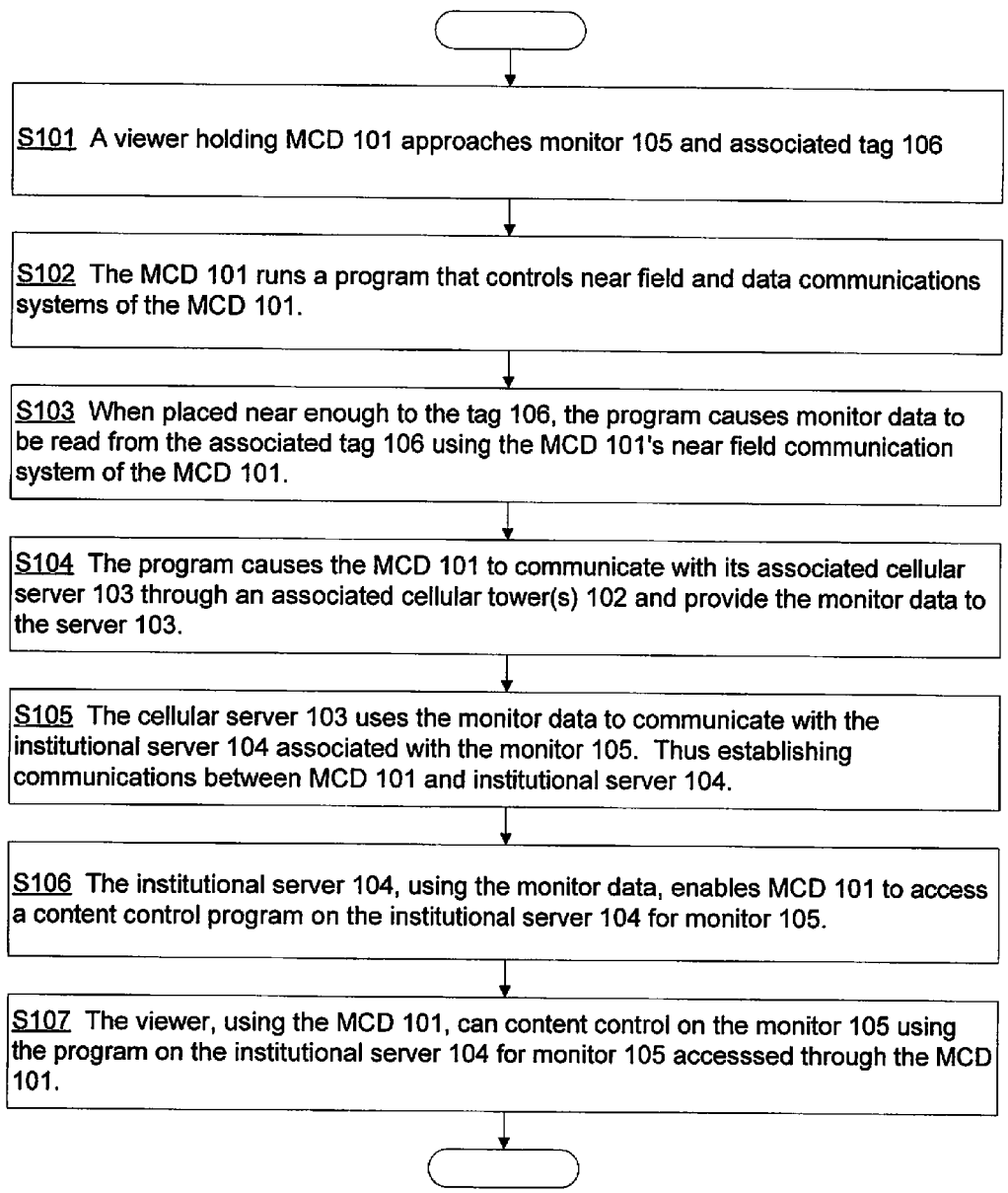
FIG. 2 is a logic flow representing an aspect of the system of FIG. 1.

FIG. 2 provides a flow diagram of operation of the control system 100 according to an embodiment invention.

In segment S101, a user in a store holding a mobile communication device 101 approaches a content publisher, e.g., monitor 105, and associated information tag 106. Process flow continues to segment S102.

In segment S102, the user selects and executes a publisher control program on her/his mobile communication device 101. Process flow continues to segment S103.

In segment S103, when the mobile communication device 101 is placed near enough to the tag 106, the publisher control program, using a near field communication system of the mobile communication device 101 causes monitor identification data, which includes data identifying the monitor and the location data of the monitor, to be received from the associated tag 106. Process flow continues to segment S104.

In segment S104, the publisher control program causes the mobile communication device 101 to communicate with its associated cellular server 103 through an associated cellular tower(s) 102 and provide the monitor data to the server 103. Process flow continues to segment S105.

In segment S105, the cellular server 103 uses the monitor data to determine which institutional server to communicate with and then attempts to establish communications with the content control program of the institutional server 104 associated with the monitor 105. Thus establishing communications between mobile communication device 101 and institutional server 103. Process flow continues to segment S106.

In segment S106, the institutional server 104, using the monitor data, enables mobile communication device 101 access to a content control program on the institutional server 104 for monitor 105. Process flow continues to segment S107.

In segment S107, the user, using the mobile communication device 101, controls content published on the monitor 105 using the program on the institutional server 104 for monitor 105 accessed through the mobile communication device 101. Process flow continues until terminated by user or by institutional server.

After the user has control of the content displayed monitor 105 through its server 104, the user using the mobile communication device 101 can control what and how information is displayed on the monitor 105.

After a predefined period of time, the institutional server 104 severs communications with the mobile communication device 101. The user can reinitiate communications with the institutional server 104, as described above. Alternatively, a different user using a different mobile communication device 101 can initiate communications with the institutional server 104 to control the content displayed on monitor 105.

Thus, a user having a near field communication enabled mobile communication device 101 controls the content displayed on monitor 105—a user can approach an item in a store and have the ability to select content to be published on a monitor for the selected item.

Figure 3:
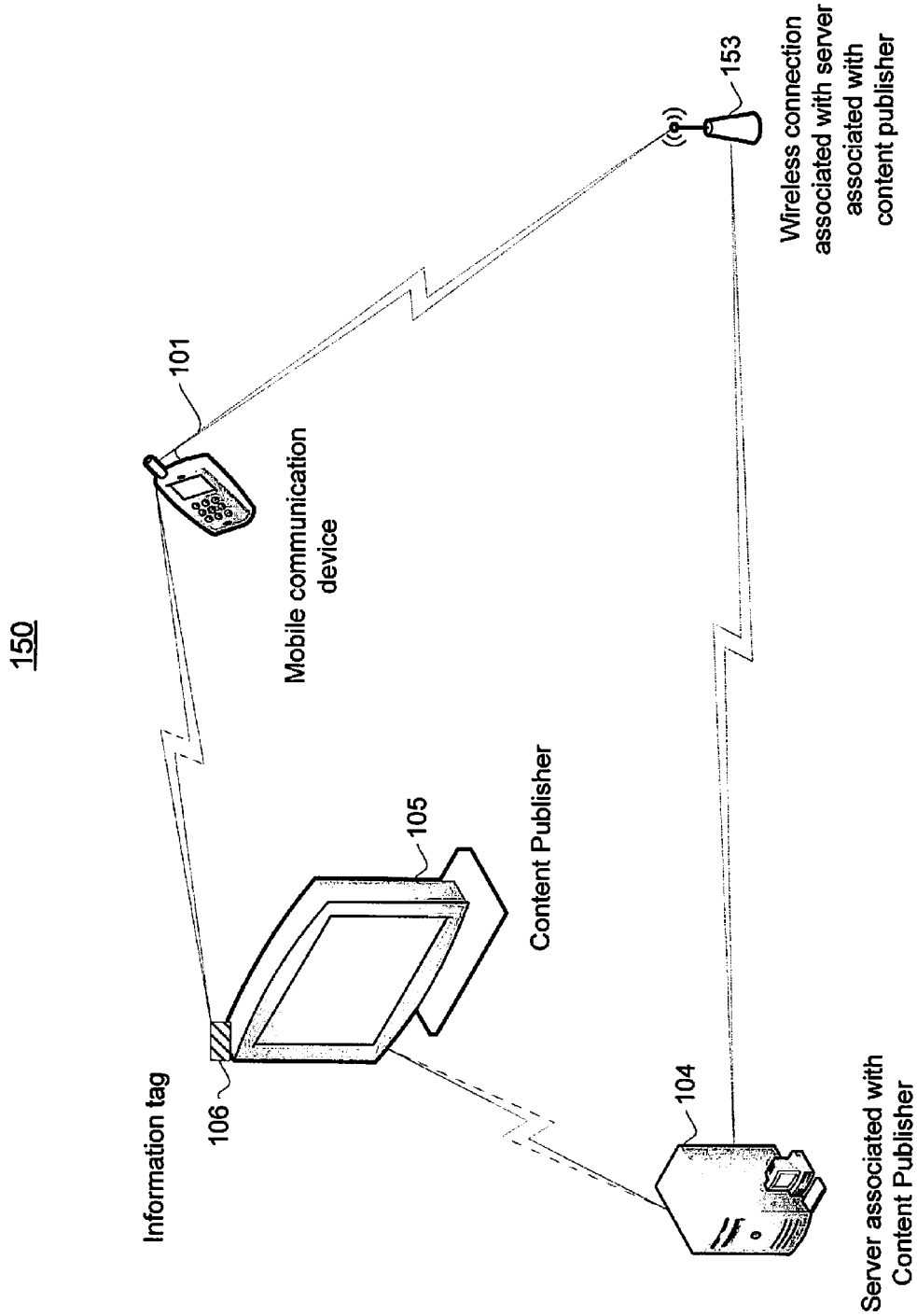
FIG. 3 is a remote control system in accordance with an exemplary embodiment of the invention in accordance with a variation of the system of FIG. 1.

FIG. 3 depicts the near field remote controlling system 150 according to another exemplary embodiment. The system 150 includes a near field communication capable mobile communication device 101, a network system 153, server 104 associated with content publisher, and content publisher, a monitor, 105. The system 150 is similar to the system 100 with the notable difference being that the mobile communication device 101 communications with the server 104 through a network system 153 rather than through its cellular service. Network system 153 is, preferably, a local Wi-Fi system associated with the server 104.

Figure 4:
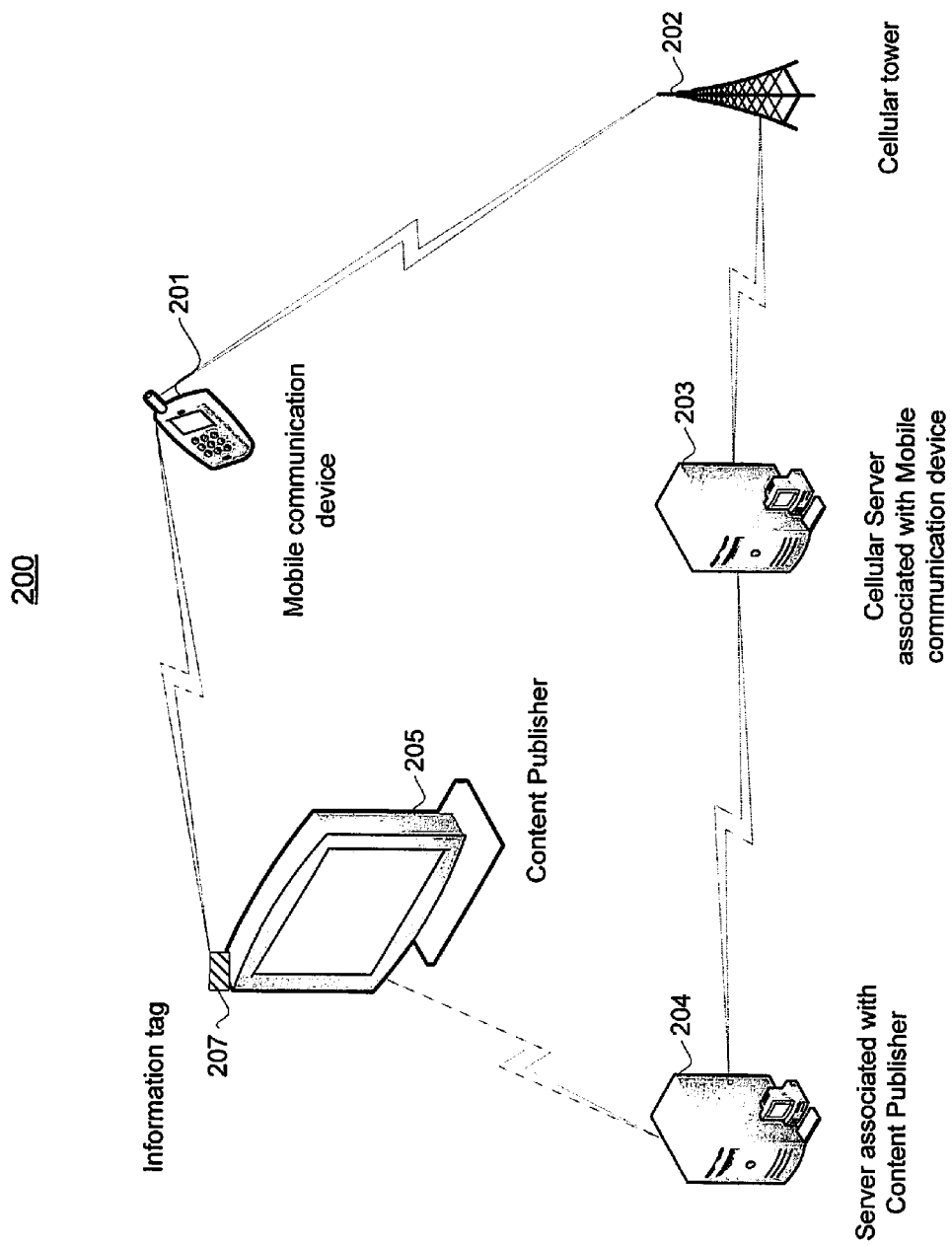
FIG. 4 is a remote control system in accordance with another exemplary embodiment of the invention.

FIG. 4 depicts the near field remote controlling system 200 according to an exemplary embodiment. The system 200 includes a near field communication capable mobile communication device 201, a cellular tower 202, a cellular server 203, an institutional server 204, a monitor 205, and a NFC communicator 207.

Mobile communication device 201 is a cell phone, smart phone or another portable communication device that is capable of near field communications and capable of data communications. Cellular tower 202 provides communication ability between the mobile communication device 201 and its corresponding cellular server 203. The cellular server 203 provides data storage and system processing services for at least clients of the provider of the cellular service.

Institutional server 204 provides data storage and system processing services for an institutional server. The content publisher 205 is typically TV/computer monitor located in a sales/advertising area of a store or business and displays content, preferable to a user. The content is audio-visual medium, e.g., movies, videos, etc. The monitor 205 is connected to and in communication with institutional server 204. In a mode, the institutional server serves as a content source and provides the content for publishing, i.e., display, on monitor 205. In a mode, the institutional server 204 is the source content controller—it provides and controls the content displayed on monitor 205.

Associated with monitor 205 is an NFC communicator 207, which can communicate with institutional server 204. The NFC communicator 207 reads identifying information through NFC communications, e.g., from a mobile communication device 201. In an approach, the identifying information uniquely identifies the mobile communication device 201 of the user, and is, for example, the electronic serial number of the mobile communication device 201.

The mobile communication device 201 runs, automatically, constantly, or upon request, an appropriate software/hardware program that controls the near field communication system to provide mobile communication device identifying data through NFC communications to a NFC communicator 207.

The NFC communicator 207 uses the identifying data and contacts its institutional server 204; which, in turn, using information from the identifying data to identify which mobile communication device 201 to be connected to, causes communication between the mobile communication device 201 and the institutional server 204. The program on the institutional server 204, using information associated with the NFC communicator, determines which monitor 205 that the mobile communication device 201 is seeking to control and provides access for the mobile communication device 201 to a control program for controlling the content display on monitor 205. Based on identifying information received by the institutional server 204 from the mobile communication device 201, the institutional server 204 provides commands to be communicated to the monitor 205 to permit the mobile communication device 201 to control the content displayed on monitor 205.

Thus, for example, the monitor 205 is located in a Brookstone® retail store in Palm Beach Gardens, Fla. and the monitor 205 is in the personal relaxation section of the store and is located next to and associated with a store item, e.g., chair massage device. The content display program determines appropriate choices of content to be published. In a preferred approach, the content display program is dynamic and can easily change or modify the content choice. In an approach, the content choice is specific to the associated item. In an approach, the content is marketing material about the associated item that is stored on and/or accessible by the content display program but located somewhere else, e.g., a manufacturer's website. However, content options also include, for example, all or some combination of: various uses for the item, various configurations/options for the item, associated accessories, similar items, pricing (store prices and/or competitor's price), frequently asked questions, warranty/guarantee, availability, instructions on assembly, and instructions on use. Content options may also include information about various items for sale located near the associated item, information about this department of the store, information about this store location, and information about the store, e.g., the company that owns the store. Once the content is selected, the server 204 directs or provides the respective content to the monitor 205, and the monitor 205 published the content.

In an approach, the user using publisher control program also controls logistics of the publishing of the content on the monitor. For example, the user controls: the volume as well, as forwarding, reversing, pausing, stopping and replaying the publishing of the content on the monitor.

In a preferred approach, a program on the institutional server 204 alone, or cooperation with content display program, controls access by users to the content display program. For example, the content display program performs traffic control for multiple users substantially simultaneously seeking access to the content display program for a same item. As part of the traffic control, the content display program prioritizes and enables access by a specific user at a time for a specific item. The content display program may also limit the length of time a user has access to the content display program. For example, the content display program disconnects, in cordial approach, the user from the content display program after three minutes of use if another user has indicated that she wants access to the content display program; the indication based on another user seeking access to the content display program for the associated item. Further, the content display program disconnects the user from the content display program after one minute of lack of response to a prompt by the content display program for a response by the user. In either case, the user is not blocked from subsequently attempting to access the content display program, but may be subject to a traffic control protocol by the content display program.

The content display program may be a single program running on a single server or on several servers or in any reasonably combination. Further, multiple users can access the content display program substantially simultaneously for access to content display for multiple items. Thus, more than one user can control content publishing at a time.

Thus, using her/his own mobile communication device 201, a user can approach an item in a store and have the ability to select content to be published on a monitor for the selected item.

Figure 5:
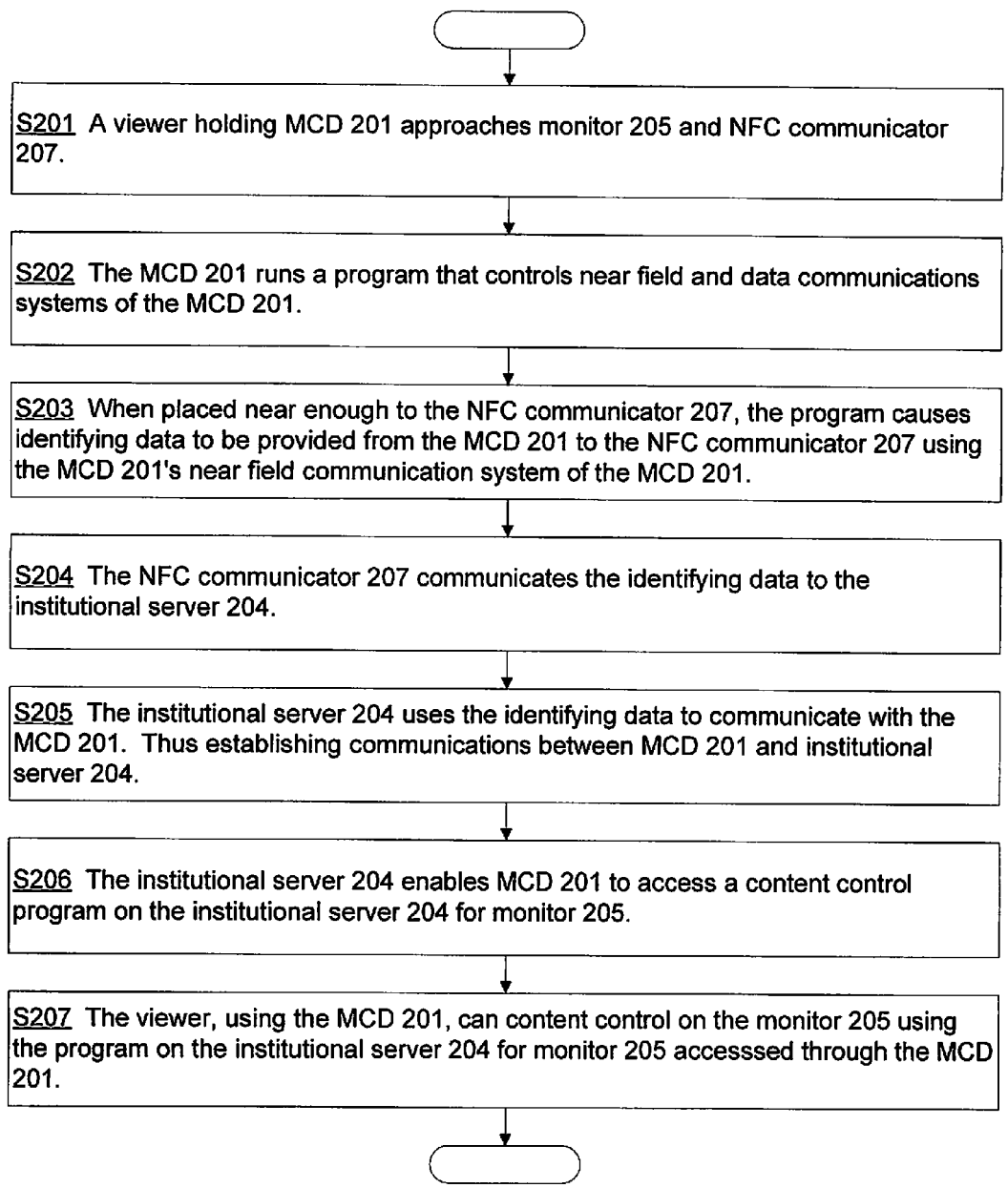
FIG. 5 is a logic flow representing an aspect of the system of FIG. 4.

FIG. 5 provides a flow diagram of operation of the control system 200 according to an embodiment of the invention.

In segment S201, a user holding mobile communication device 201 approaches monitor 205 and NFC communicator 207. Process flow continues to segment 202.

In segment S202, the mobile communication device 201 runs a program that controls near field and data communications systems of the mobile communication device 201. Process flow continues to segment S203.

In segment S203, when placed near enough to the NFC communicator 207, the program causes identifying data to be provided from the mobile communication device 201 to the NFC communicator 207 using the mobile communication device 201's near field communication system of the mobile communication device 201. Process flow continues to segment S204.

In segment S204, the NFC communicator 207 communicates the identifying data to the institutional server 204. Process flow continues to segment S205.

In segment S205, the institutional server 204 uses the identifying data to communicate with the mobile communication device 201. Thus establishing communications between mobile communication device 201 and institutional server 204. Process flow continues to segment S206.

In segment S206, the institutional server 204 enables mobile communication device 201 to access a content control program on the institutional server 204 for monitor 205. Process flow continues to segment S207.

In segment S207 the user, using the mobile communication device 201, can content control on the monitor 205 using the program on the institutional server 204 for monitor 205 accessed through the mobile communication device 201.

Thus, a user having a near field communication enabled mobile communication device 201 controls the content displayed on monitor 205.

Figure 6:
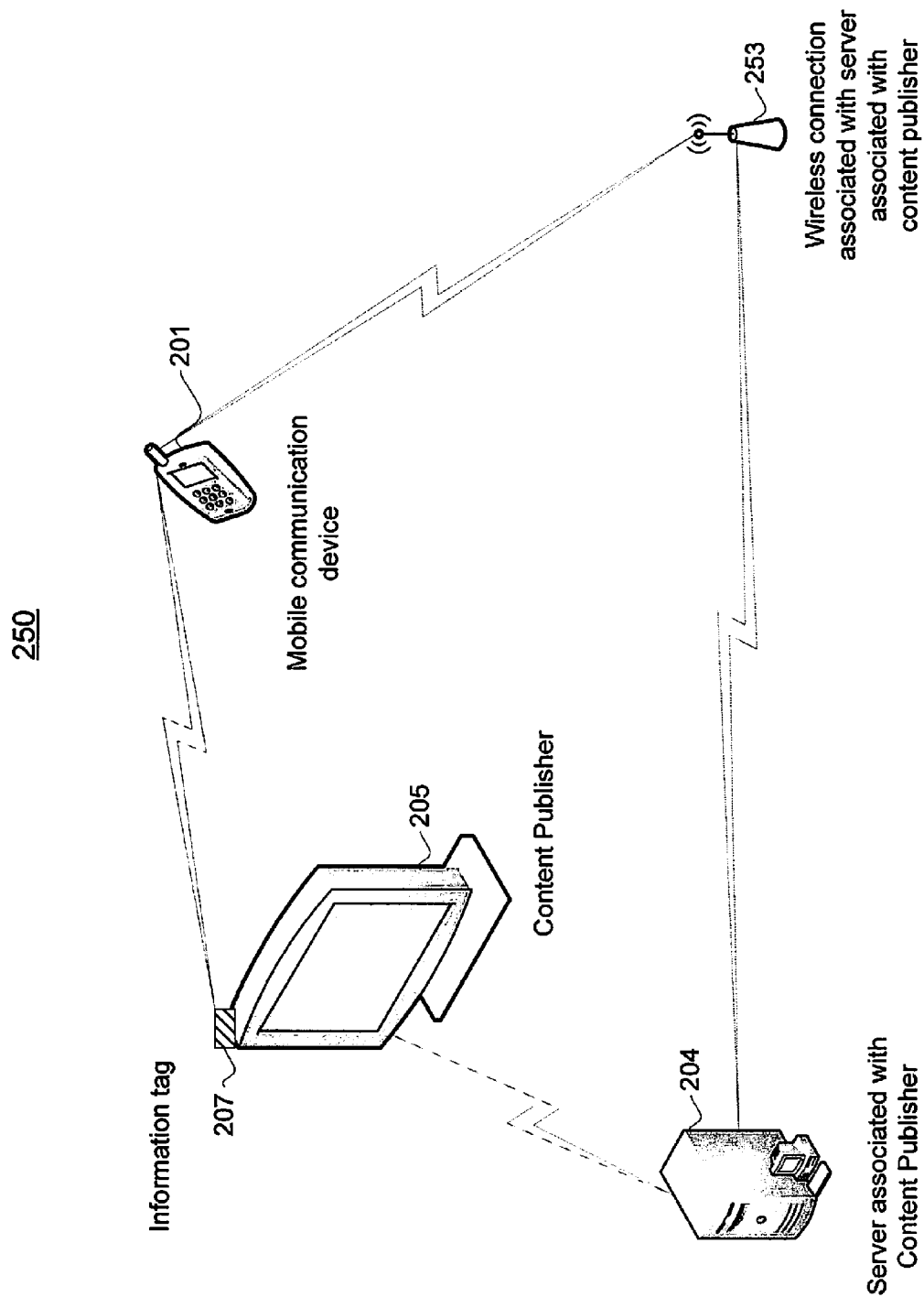
FIG. 6 is a remote control system in accordance with an exemplary embodiment of the invention in accordance with a variation of the system of FIG. 4.

FIG. 6 depicts the near field remote controlling system 250 according to another exemplary embodiment. The system 2 includes a near field communication capable mobile communication device 201, a network system 253, server 204 associated with content publisher, and content publisher, a monitor, 205. The system 250 is similar to the system 200 with the notable difference being that the mobile communication device 201 communications with the server 204 through a network system 253 rather than through its cellular service. Network system 253 is, preferably, a local Wi-Fi system associated with the server 204.

While the invention has been described and illustrated with reference to specific exemplary embodiments, it should be understood that many modifications, various combination of the exemplary embodiments described above, and substitutions can be made without departing from the spirit and scope of the invention. Although the examples above are described with respect to displaying audio-visual content as the published content, the invention is not so limited. For example, the published content is music. Furthermore, although the application refers to near field communications, the invention is not intended as being limited to only NFC communications and is intended to include NFC communications as well as any other short distance communications, where the distances are typically less than one (1) meter. Although the invention is generally described with respect to a content publisher being located in a store, the invention is not so limited. Accordingly, the invention is not to be considered as limited by the foregoing description but is only limited by the scope of the claims.

What is claimed as new and desired to be protected by Letters Patent of the United States is:

1. A system for controlling a content display, the system comprising:
   a short distance radio transmitter configured to provide first data to a mobile communication device, wherein the first data is associated with the content display; and
   a computer system associated with the short distance radio transmitter, wherein the computer system is configured to:
   receive the first data from the mobile communication device;
   identify the content display based on the first data;
   receive, from the mobile communication device, a request for content to be displayed on the content display;
   provide the requested content to the content display; and
   automatically disconnect the mobile communication device from the content display upon expiration of a time limit.

2. The system of claim 1, wherein the computer system is further configured to receive second data from the mobile communication device, and wherein the second data identifies the mobile communication device.

3. The system of claim 1, wherein the computer system is further configured to determine content options to be provided to the content display based on the first data.

4. The system of claim 3, wherein the computer system is further configured to provide the content options to the mobile communication device.

5. The system of claim 4, wherein the computer system is further configured to receive a selection of one of the content options from the mobile communication device.

6. The system of claim 3, wherein the first data is associated with a location within a store.

7. The system of claim 1, wherein the computer system is further configured to provide logistical content publishing options to the mobile communication device.

8. The system of claim 1, wherein the first data is associated with an item.

9. A system for controlling a content display, the system comprising:
- a short distance radio receiver associated with first data and configured to receive second data from a mobile communication device, wherein the first data is associated with the content display and the second data identifies the mobile communication device; and
- a computer system associated with the short distance radio receiver, wherein the computer system is configured to:
  - enable the mobile communication device to control what content is provided to the content display, wherein the content provided to the content display is based at least in part on the first data;
  - provide the content to the content display; and
  - automatically disconnect the mobile communication device from the content display upon expiration of a time limit.

10. The system of claim 9, wherein the computer system is further configured to identify content options based at least in part on the first data.

11. The system of claim 10, wherein the computer system is further configured to provide the content options to the mobile communication device identified by the second data.

12. The system of claim 11, wherein the computer system is further configured to receive a selection of one of the content options from the mobile communication device.

13. The system of claim 12, wherein the content provided to the content display is based on the selection.

14. The system of claim 9, wherein the computer system is further configured to provide logistical content publishing options to the mobile communication device.

15. The system of claim 9, wherein the first data is associated with an item.

16. The system of claim 9, wherein the first data is associated with a location within a store.

17. A method for controlling a content display, the method comprising:
- receiving, at a computer system associated with a short distance radio transmitter, first data from a mobile communication device, wherein the first data is associated with the content display, and wherein the first data originates from the short distance radio transmitter;
- identifying the content display based on the first data;
- receiving, from the mobile communication device, a request for content to be displayed on the content display;
- providing the requested content to the content display; and
- automatically disconnecting the mobile communication device from the content display upon expiration of a time limit.

18. The method of claim 17, further comprising determining content options for the content display based at least in part on the first data.

19. The method of claim 18, further comprising providing the content options to the mobile communication device.

20. The method of claim 19, wherein receiving the request comprises receiving a selection of one of the content options from the mobile communication device.

21. The method of claim 17, wherein the time limit is based at least in part on whether another mobile communication device requests control of the content display.

22. The method of claim 17, further comprising enabling the mobile communication device to pause, stop, fast forward, or rewind the requested content on the content display.

23. A method for controlling a content display, the method comprising:
- providing, from a mobile communication device, first data to a computer system associated with a short distance radio transmitter, wherein the first data is associated with the content display, and wherein the first data originates from the short distance radio transmitter;
- receiving, from the computer system, content options for presentation on the content display, wherein the content options are based at least in part on the first data;
- receiving a selection of one of the content options to be displayed on the content display;
- providing the selection to the computer system such that the selected content option is displayed on the content display; and
- receiving an indication from the computer system that, upon expiration of a time limit, the mobile communication device will be disconnected from the content display.

* * * * *